(12) United States Patent
Cutler et al.

(10) Patent No.: US 6,468,325 B1
(45) Date of Patent: Oct. 22, 2002

(54) METHOD OF MAKING PHOSPHATE-BASED CERAMIC FILTERS

(75) Inventors: Willard A. Cutler, Big Flats, NY (US); Gregory A. Merkel, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/680,102

(22) Filed: Oct. 5, 2000

Related U.S. Application Data
(60) Provisional application No. 60/157,896, filed on Oct. 5, 1999.

(51) Int. Cl.[7] .......................... B01D 39/20; C04B 35/48
(52) U.S. Cl. ................ 55/523; 55/DIG. 5; 55/DIG. 30; 501/102; 501/103; 501/104
(58) Field of Search .......................... 55/523, 524, 529, 55/DIG. 5, DIG. 30; 501/102, 104, 106, 103; 423/306

(56) References Cited

U.S. PATENT DOCUMENTS

| | | | |
|---|---|---|---|
| 4,329,162 A | * 5/1982 | Pitcher, Jr. .................... 55/523 |
| 4,675,302 A | 6/1987 | Roy et al. | |
| 4,751,206 A | * 6/1988 | Yamai et al. ................. 501/102 |
| 4,758,272 A | * 7/1988 | Pierotti et al. ................. 55/523 |
| 4,781,831 A | 11/1988 | Goldsmith | |
| 4,801,566 A | 1/1989 | Limaye et al. | |
| 4,820,668 A | * 4/1989 | Kato et al. ................... 501/134 |
| 4,925,816 A | * 5/1990 | Watanabe et al. ........... 501/104 |
| 4,968,648 A | 11/1990 | Watanabe et al. | |
| 5,009,781 A | 4/1991 | Goldsmith | |
| 5,034,023 A | * 7/1991 | Thompson .................... 55/523 |
| 5,082,480 A | * 1/1992 | Dorazio ....................... 55/523 |
| 5,102,836 A | 4/1992 | Brown et al. | |
| 5,108,601 A | 4/1992 | Goldsmith | |
| 5,128,288 A | 7/1992 | Ohashi et al. | |
| 5,217,934 A | * 6/1993 | Matsuhiro et al. .......... 501/106 |
| 5,254,510 A | 10/1993 | Matsuhiro et al. | |
| 5,488,018 A | 1/1996 | Limaye | |
| 5,750,026 A | * 5/1998 | Gadkaree et al. ............. 55/523 |

* cited by examiner

Primary Examiner—Duane Smith
Assistant Examiner—Jason M. Greene
(74) Attorney, Agent, or Firm—Anca C. Gheorghiu

(57) ABSTRACT

The present invention provides a method of making a ceramic filter, by forming a mixture from NZP-forming raw material powders selected from metal oxide sources capable of reacting to form a reaction product comprising an NZP-type phase having the general formula $R_{1+(y/2)}Zr_4P_{6-y}Si_yO_{24}$ where $0 \leq y \leq 1.0$ and R is one or more of the metals Ca, Sr, and Ba, pre-reacted powder having the same general formula, and mixtures thereof; and a precursor additive selected from the group consisting of silica precursor, zirconia precursor, and mixtures thereof; shaping the mixture into a green structure; and, firing the green structure to produce a ceramic filter having an open porosity of at least 35% by volume, a median pore size of at least 8 micrometers and a permeability of at least $0.30 \times 10^{-12}$ m$^2$, and being suitable as a diesel particulate filter.

44 Claims, 2 Drawing Sheets

METHOD OF MAKING PHOSPHATE-BASED CERAMIC FILTERS

This application claims the priority of U.S. Provisional Application No. 60/157,896 entitled METHOD OF MAKING PHOSPHATE-BASED CERAMIC BODIES WITH PRECURSOR ADDITIONS filed on Oct. 5, 1999 in the name of Willard A. Cutler.

CROSS-REFERENCE TO RELATED APPLICATIONS

An application entitled REFRACTORY NZP-TYPE STRUCTURES AND METHOD OF MAKING AND USING SAME was filed as a U.S. Provisional Application No. on Oct. 5, 1999 having Serial No. 60/157,895, in the name of Gregory A. Merkel, and assigned to the same assignee as this application, is directed to NZP-type structures of high permeability suitable for use in filtration application such as diesel particulate filtration.

BACKGROUND OF THE INVENTION

The present invention relates to filters for use in exhaust streams for capturing particulate material. In particular the present invention relates to porous ceramic diesel exhaust filters based on phosphate ceramics.

Co-pending U.S. Provisional Application having Serial No. 60/157,895 discloses a structure for use in filtration applications, such as diesel exhaust filtration, comprising predominantly an NZP-type phase having the general formula $R_xZ_4P_{6-y}Si_yO_{24}$, where $0 \leq x \leq 8$, $0 \leq y \leq 6$, R is Li, Na, K, Rb, Cs, Mg, Ca, Sr, Ba, Y, and/or lanthanides, and Z is Zr, Ti, Nb, Ta, Y, and/or lanthanides, and optionally a sintering additive. The structure has an open porosity of at least 20% by volume, a median pore diameter in micrometers equal to or greater than a value defined by the quantity [10−0.10(% open porosity)], both as measured by mercury porosimetry, and four-point modulus of rupture as measured on a solid rod of circular cross section, of at least 300 psi. This ceramic structure has a melting point in excess of 1700° C. and a coefficient of thermal expansion lower than $10 \times 10^{-7}/°$ C., making it extremely suitable for high temperature applications such as diesel particulate filters.

Notwithstanding these findings, reaction sintered NZP-type phase ceramics of the type described when extruded into large size (i.e., greater than 4" in diameter) cellular honeycomb structures have a tendency to crack during/after binder removal, but before sintering due to the large particle size of the raw materials.

A need therefore exists for honeycomb cellular structures comprising reaction sintered NZP-type phase ceramics which remain wholly intact and crack-free despite using large raw material sizes.

The present invention provides such a honeycomb cellular structure and a method of making the same.

SUMMARY OF THE INVENTION

The present invention provides a method of making a ceramic filter, which includes the steps of forming a mixture from NZP-forming raw material powders selected from the group consisting of metal oxide sources capable of reacting to form a reaction product comprising an NZP-type phase having the general formula $R_{1+(y/2)}Zr_4P_{6-y}Si_yO_{24}$ where $0 \leq y \leq 1.0$ and R is one or more of the metals Ca, Sr, and Ba, pre-reacted powder having the same general formula, and mixtures thereof; and a precursor additive selected from the group consisting of silica precursor, zirconia precursor, and mixtures thereof; shaping said mixture into a green structure; and, firing said green structure to produce a ceramic filter. The precursor additive is at least 1% based on the weight of the mixture, and more preferably between 4% and 8% based on the weight of the mixture.

The mixture may also optionally include a pore former, such as graphite, of at least 10% based on the weight of the raw materials and a sintering aid selected from the group consisting of magnesium, zinc, calcium, aluminum, lanthanum, titanium, bismuth, tungsten, and mixtures thereof. The sintering additive is between about 0.05 wt. % to 10 wt. % based on the weight of the raw materials.

The inventive method is especially useful in enabling the production of large-size honeycomb cellular substrates having than 4 inches in diameter which do not crack during the firing (sintering) cycle. The cellular substrates are particularly suitable as diesel particulate filters and have an open porosity of at least about 35% by volume, a median pore size of at least 8 micrometers, and a permeability of greater than $0.30 \times 10^{-12}$ m².

DETAILED DESCRIPTION OF THE INVENTION

Figure 1:
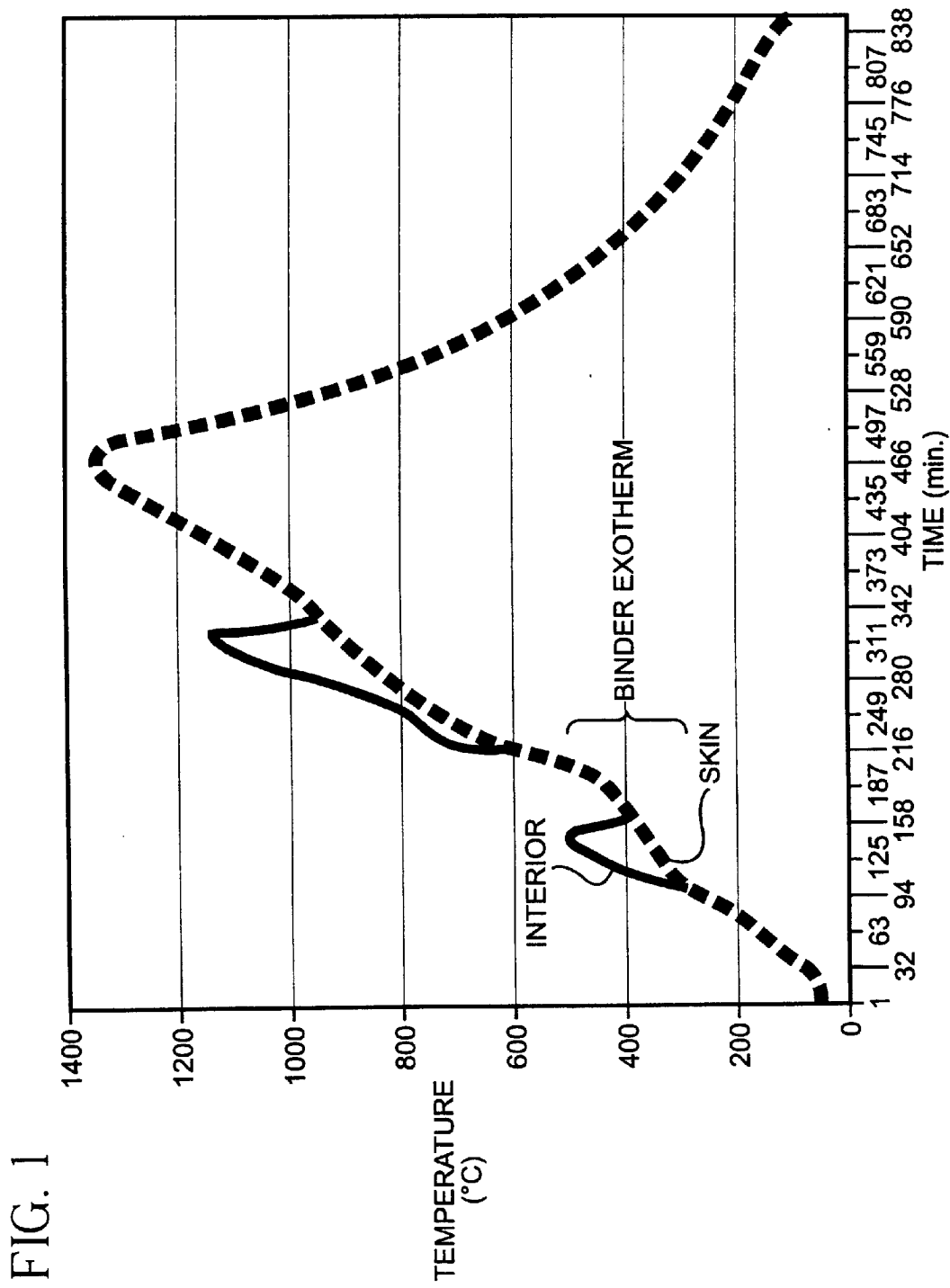
FIG. 1 shows the binder exotherm during binder burnout or removal in an inventive composition as exemplified in Example 5.

The present invention relates to a method of making large (i.e., greater than 4 inch diameter) multicellular substrates which resist cracking during/after binder removal, comprising a ceramic which is predominately an "NZP-type" phase. The substrates are especially suitable in the high temperature filtering applications such as diesel particulate filters.

For the purposes of the present invention "NZP-type" means a solid phase in which the arrangement of atoms is generally similar to that of the type compound $NaZr_2P_3O_{12}$, but in which some or all of the sodium, zirconium, or phosphorus is replaced by other substituent atoms. Also, additional atoms may be substituted into the crystal lattice sites that are vacant in $NaZr_2P_3O_{12}$, but which are fully occupied in the $Na_4Zr_2Si_3O_{12}$ compound, which is also an NZP-type phase.

The NZP-type phase of the present invention is of the general formula $R_xZ_4P_{6-y}Si_yO_{24}$, where $0 \leq x \leq 8$, $0 \leq y \leq 6$, R is one or more of the elements Li, Na, K, Rb, Cs, Mg, Ca, Sr, Ba, Y, and lanthanides, and Z is one or more of the elements Zr, Ti, Nb, Ta, Y, and lanthanides. Cations are selected to maintain charge balance. A formula especially suited for use in diesel particulate filtration is $R_{1+(y/2)}Zr_4P_{6-y}Si_yO_{24}$ where $0 \leq y \leq 1.0$ and R is one or more of the metals Ca, Sr, and Ba.

The NZP-forming raw materials are (1) metal oxide sources that react to form the NZP phase, and/or (2) partially or completely pre-reacted NZP powder. The general formula or composition of the NZP-phase is $R_xZ_4P_{6-y}Si_yO_{24}$, where the x and y values and the R and Z metals are as described above.

Coarse median particle size of the raw material mixture is necessary for a sufficiently large median pore size and high permeability in the final structure. Median particle size is the median particle diameter in micrometers based upon a volumetric distribution. It is determined by a particle size analyzer employing the laser diffraction technique.

Suitable raw material particle sizes and size distributions, applicable to the totality of the raw material powder particles are (1) at least about 90% by volume of the totality of the raw material powder particles with a particle size of greater than about 11 micrometers, (2) average of the median particle sizes of the raw materials used in the raw materials combination at least about 25 micrometers, and (3) average of the median particle sizes of the raw materials used in the raw materials combination at least about 35 micrometers. For these conditions it is preferred to have no particulate pore former in the mixture.

Suitable raw materials are compounds of zirconium and phosphorus. When these compounds are used, it is preferred that the median particle size of the phosphorus compounds be at least about 15 micrometers, preferably at least about 25 micrometers, and more preferably at least about 50 micrometers. Some preferred compounds are $Zr_2P_2O_9$, $ZrP_2O_7$, $Zr(HPO_4)_{2-y} \cdot xH_2O$, and mixtures of these, where $0 \leq y \leq 1$ and $0 \leq x \leq 2$. Also preferred are zirconium phosphate powders composed of one or more crystalline or amorphous phases whose composition can be expressed as $Zr_2P_{2+2y}O_{9+5y}$ where $0 \leq y \leq 1$.

Other advantageous raw materials are zirconia with a preferred median particle size of at least about 20 micrometers, and more preferably greater than 30 micrometers.

Other advantageous raw materials are sulfates and/or carbonates of calcium, strontium, and/or barium. With these raw materials it is preferred that the median particle size of the total charge of the selected compounds be at least about 15 micrometers, more preferably at least about 35 micrometers, even more preferably at least 50 micrometers, and may be in excess of 100 micrometers.

Still other suitable raw materials are $CaZrO_3$, $SrZrO_3$, $BaZrO_3$, and mixtures of these. Here also, with these particular raw materials it is preferred that the median particle size of the total charge of the selected compounds be at least about 15 micrometers, more preferably at least about 35 micrometers, even more preferably at least 50 micrometers, and may be in excess of 100 micrometers.

In the inventive method a precursor additive is added to the raw materials batch. The precursor additive which is selected from the group consisting of silica precursor, zirconia precursor and mixtures thereof, provides good skin characteristics and but especially good strength during and after binder removal and inhibits large exotherms (i.e., heat given off) during binder removal, which can lead to cracking in structure and failure of the final filter product. For best results the precursor additive is at least 1 wt. % of the total weight of the batch, and most preferably between 4 to 8 wt. %.

Suitable silica precursors for the present invention include silicone resin, such as Dow Corning 6-2230,1-0543, Z6018 (manufactured by Dow Corning, Midland, Mich.), and silicone oils.

Suitable zirconia precursors for the present invention include a variety of Zr metal salts as well as zirconia colloids.

The precursor additive can be added in the form of a solid, or more preferably in the form of a liquid. In one embodiment the liquid precursor can be added as a super-addition to the batch. For the purposes of the present invention "super-addition" means a weight or mole basis above and beyond the amount required to achieve 100% of the desired inorganic phase.

In another embodiment, the liquid precursor may replace some or all of the powdered raw material constituents so that chemical composition balance was maintained.

In another embodiment, the precursor may be cross-linkable.

The precursor additive provides the green bodies with a better strength after binder burnout and before sintering. This is especially important in large parts which tend to crack or collapse during firing under their own weight if the strength, during or after binder burnout is not sufficiently high. It has been found that with the addition of a precursor additive as described above, large parts have higher strengths after binder burnout and lower exotherms during binder removal or burnout (i.e., less heat is given off during binder removal), and as a result are able to maintain their shape during firing and resist cracking.

Optionally a sintering aid or additive is added. Suitable sintering additives include certain metal oxides, or organic or inorganic compounds that form the metal oxide during heating, which react with the NZP-type phase to promote sintering between the NZP crystal grains in the ceramic, thereby improving the strength of the body. Some suitable sintering additives, although it is to be understood that the invention is not limited to such, are sources of one or more of the metals of magnesium, zinc, calcium, aluminum, lanthanum, titanium, bismuth, and tungsten. It is preferred that the sintering additive, when it is used, be present in the mixture at a level of about 0.05% to 10%, and more preferably about 0.1% to 1% by weight based on the raw material powders. The sintering aid can be added as a powder or liquid form to the mixture of NZP-forming raw materials and further blended with the raw materials.

Optionally a pore formed is added. For the purposes of the present invention a "pore former" is a fugitive particulate material which evaporates or undergoes vaporization by combustion during drying or heating of the green body to obtain a desired, usually larger porosity and/or coarser median pore diameter than would be obtained otherwise. When a pore former is used, it is advantageous that it be a particulate pore former and be present in an amount of at least about 10 weight % based on the raw materials. In this case the median particle size of the particulate pore former is preferably at least about 10 micrometers. One especially suitable particulate pore former is graphite having a median particle size of at least about 10 micrometers, and more preferably at least 25 micrometers. As much as 60% of a pore-former can also be added to the powder mixture to further increase the permeability of the fired body.

The NZP-forming raw materials are mixed together, but extensive milling of the particles during mixing which might substantially reduce the size of the particles in the mixture is to be avoided.

The mixture is shaped into a green body by a method such as injection molding, compression molding, pressure casting, dry pressing, and extrusion.

Preferably, extrusion is employed to shape the mixture. Extrusion may done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal.

While the extruded body can have any shape or geometry, it is preferred that it be a honeycomb multicellular structure.

The honeycomb structure has an inlet and outlet end or face, and a multiplicity of cells extending from the inlet end to the outlet end, the cells having porous walls. Generally honeycomb cell densities range from about 4 cells/cm$^2$ (25 cells/in$^2$) to about 93 cells/cm$^2$ (600 cells/in$^2$).

A portion of the cells at the inlet end or face are plugged with a paste having same or similar composition to that of the green body, as described in U.S. Pat. No. 4,329,162 which is herein incorporated by reference. The plugging is only at the ends of the cells which is typically to a depth of about 9.5 to 13 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as a "wall flow" filters since the flow paths resulting from alternate channel plugging require the exhaust being treated to flow through the porous ceramic cell walls prior to exiting the filter.

The green body may be first plugged, then dried according to conventional, art-known methods. Thereafter it is heated to a maximum temperature of about 1200° C. to 1750° C. over a period of about 2 to 200 hours, preferably 10 to 100 hours, and held at the maximum temperature for 0.1 to 100 hours, preferably 1 to 30 hours. The firing may be conducted in an electrically heated furnace or gas kiln, or the green structure may be heated by microwave radiation. The partial pressure of oxygen in the firing atmosphere is preferably at least 0.01 atmospheres, and more preferably at least 0.10 atmospheres, especially when the hold temperature is greater than about 1450° C. Higher hold temperatures and longer hold times are advantageous for increasing the strength and median pore size of the structure, and can also reduce the coefficient of thermal expansion.

Alternatively, the green body without plugs is first dried and then fired as above. After cooling, alternate channels are then plugged with a paste of NZP-forming raw materials which undergo minimal shrinkage during firing, and refired to a temperature of 1200° C. to 1750° C. to consolidate the plugs, or the alternate channels may be plugged with a cement material which hardens or cures to a refractory material after drying or heating to a low temperature such as less than 600° C.

It is preferred that substrates made according to the inventive method have cellular densities between about 10 and 400 cells/in$^2$ (about 1.5 to 62 cells/cm$^2$), more typically about 150 and 300 cells/in$^2$ (about 23.3 to 46.5 cells/cm$^2$), which are considered useful to provide sufficient thin wall surface are in a compact structure. Wall thickness can vary upwards from the minimum dimension providing structural integrity, of about 0.002 in. (about 0.05 mm), but is generally less than about 0.06 in. (1.5 mm) to minimize filter volume. A range between about 0.010 and 0.030 inches (about 0.25 mm and 0.76 mm) e.g., 0.0.012 to 0.025 inches, is preferred.

Inventive structures exhibit high permeability by virtue of high, interconnected porosity and large median pore size. Open porosity reported as volume percent and pore size reported as median pore diameter in micrometers are measured by mercury porosimetry.

Interconnected open porosity is at least about 35% by volume and preferably less than about 65% to maintain strength. Preferably, open porosity is at least 42%.

The median pore size is at least 8 micrometers, preferably, at least 9 micrometers, and most preferably, at least 15 micrometers. Good filtration efficiency for diesel exhaust from current engines is anticipated by maintaining the median pore size below about 40 micrometers.

The permeability is at least about $0.30 \times 10^{-12}$ m$^2$, preferably at least about $0.50 \times 10^{-12}$ m$^2$, and more preferably at least about $1.0 \times 10^{-12}$ m$^2$, and most preferably at least $2.0 \times 10^{-12}$ m$^2$. The permeability is a measure of how easily a fluid can flow through the porous structure. At a constant temperature and fluid viscosity the permeability depends on the pore size, percent porosity and how well connected the pores are to one another.

Inventive structures exhibit good strength, and high thermal shock resistance, making them suitable for use in harsh environments. The structures exhibit a four-point modulus of rupture as measured on a rectangular section of an unfired cellular body, heated to 400° C. in air, of at least about 10 psi and more preferably at least 20 psi. The four-point modulus of rupture as measured on a rectangular section of a fired cellular body, heated to 1200–1750° C., is at least 150 psi, and more preferably at least 200 psi, and still more preferably at least 300 psi.

The melting point of the inventive structures is greater than 1700° C. and the median coefficient of thermal expansion from 22° C. to 1000° C. be between $-10 \times 10^{-7}$/° C. and $+10 \times 10^{-7}$/° C., resulting in excellent thermal shock resistance. These properties enable the filters to function as diesel particulate filters which may undergo uncontrolled carbon soot regeneration and experience temperature excursion above 1475° C. As such the inventive filters are able to regenerate without cracking or melting when filled with at least 1.4 times the level of carbon soot.

Another advantage of the inventive method is the fabrication of multicellular substrates with good skin; more specifically the skin is substantially free of fissures, tears, or other imperfections that are visible to the naked eye. Defects of this nature in the skin would weaken the integrity of the final product, ultimately leading to its failure.

The invention can be further illustrated, by the following non-limiting examples.

EXAMPLES

All the examples have been formulated to yield a $Ba_{1.3}Zr_4P_{5.4}Si_{0.6}O_{24}$ composition. The $Ba_{1.3}Zr_4P_{5.4}Si_{0.6}O_{24}$ phase was formed from metal oxide sources. Unless otherwise specified, the source of barium was coarse $BaCO_3$ powder having a median particle size of 47 micrometers. Phosphorous was provided either as zirconium hydrogen phosphate hydrate $Zr(HPO_4)_2 \cdot H_2O$ having a median particle size of 25 micrometers, or $ZrP_2O_7$ powder, having a median particle size of 25 micrometers formed by calcination of the zirconium hydrogen phosphate hydrate powder at 1050° C. $ZrO_2$ powder having a median particle size of 38 micrometers was used as the zirconia source. The source of silica was either quartz or a silicone resin.

The precursor additive used in these examples is a silica precursor in the form of silicone resin. The silicone resin was dissolved in dibasic ester solvent (DBE) at a weight ratio of two parts silicone resin to one part solvent. The precursor was added either as a silica super addition or as the source of silica. Pore forming agents included a graphite having a median particle size of 15 micrometers.

For some examples, fine powders of $Mg(OH)_2$, ZnO, or $TiO_2$ were introduced as sintering aids.

Methyl cellulose in amounts of 5.0 to 10.0 percent by weight based upon the total weight of NZP-forming raw materials+sintering additive+pore former was added as a binder. Sodium stearate was used as a lubricant. Water was used as a solvent.

The dry raw materials were dry mixed without milling media to provide some homogenization on a macroscopic scale. The silica resin/DBE solution was next added to the batch followed by addition of sufficient water to impart plasticity to the batch.

The plastic batch was then extruded into honeycomb cellular body having a geometry of about 200 cells per square inch (31 cells/cm$^2$), and a wall thickness of about 0.012 inches (0.030 cm) to 0.020 inches (0.051 cm).

The extruded structures were dried in an oven at 95° C. followed by firing to 1200–1750° C. in an electric furnace for 6 to 20 hours, and then cooled at furnace rates.

Table 1 provides the compositions and properties of Examples 1–5. Table 2 provides the compositions and properties of Examples 6–11.

The percent porosity and median pore size were determined by mercury porosimetry.

The permeability, which is reported in m$^2$, was determined in the following manner. The fired filter was cut parallel to the axial direction. Sections of single cell walls measuring about 0.75" to 1.2" diameter were extracted and mounted on flat washer discs using a sealing adhesive. An air flow was passed through the cell wall of known thickness exposed by the washer interior diameter of known open diameter. By correlating the change in pressure drop with increasing air flow rate the permeability can then be calculated. Mean coefficients of thermal expansion from 22° to 1000° C. were measured using a dilatometer and are reported in (10$^{-7}$/° C.). Four-point flexural strengths were also measured at 400° C. on unfired samples and at 22° C. on fired samples, and are reported in pounds per square inch. The elastic modulus, which is reported in (10$^6$ lb/in$^2$), was measured using a non-destructive sonic technique. The calculated thermal shock parameter, is the an expected temperature difference at which the induced thermal stress exceeds the strength of the material, and was calculated by dividing the strength of the material by its elastic modulus and coefficient of thermal expansion.

The mean coefficients of thermal expansion from 22° C. to 1000° C. were measured on rod or cellular specimens using a dilatometer. Four-point flexural strengths were measured on rods.

Examples 1, 10, and 11 contain no precursor additive and are comparative. The properties of these examples are good in terms of pore size and permeability, but when scaled to large size parts (>4" diameter), the parts were weak before sintering and cracked during binder burnout due to a large binder burnout exotherm. FIG. 1 shows the large binder burnout exotherm for Example 11.

Examples 2 and 3 show super-additions of the silica precursor to the batch of Example 1. While the properties of the filters do not change much there is a marked improvement compared to Example 1 in the skin and matrix quality. The resin addition also aids in the formation of a smoother skin and a more continuous matrix.

In Examples 4 and 5 the silica precursor was a replacement for the silica source of Examples 2 and 3. It was observed that the porosity in the final structure decreased slightly, however, it is believed that this decrease is a result in the inconsistency in the particle size distribution of $BaCO_3$ powder used and did not appear to be a result of the silica source replacement. Porosities are around no higher than about 50%, however, the coarse pore sizes result in structures with good permeability.

Examples 2–9 are inventive and were fabricated from batches containing the precursor additive and had improved skin without fisures or marks and also, good matrix quality. However, most important large diameter parts (>4") of these examples exhibited good strength before sintering and lower exotherms during binder burnout, and no cracking.

Examples 9–10 are compositions without pore formers. The 400° C. strength of unfired filters with the same nominal silicon and phosphorus amounts is dramatically different for Example 9 which had the precursor when compared with Example 10 which was without the precursor. The inventive precursor-based filters exhibit an order of magnitude higher strength in the temperature range for binder burnout.

Figure 2:
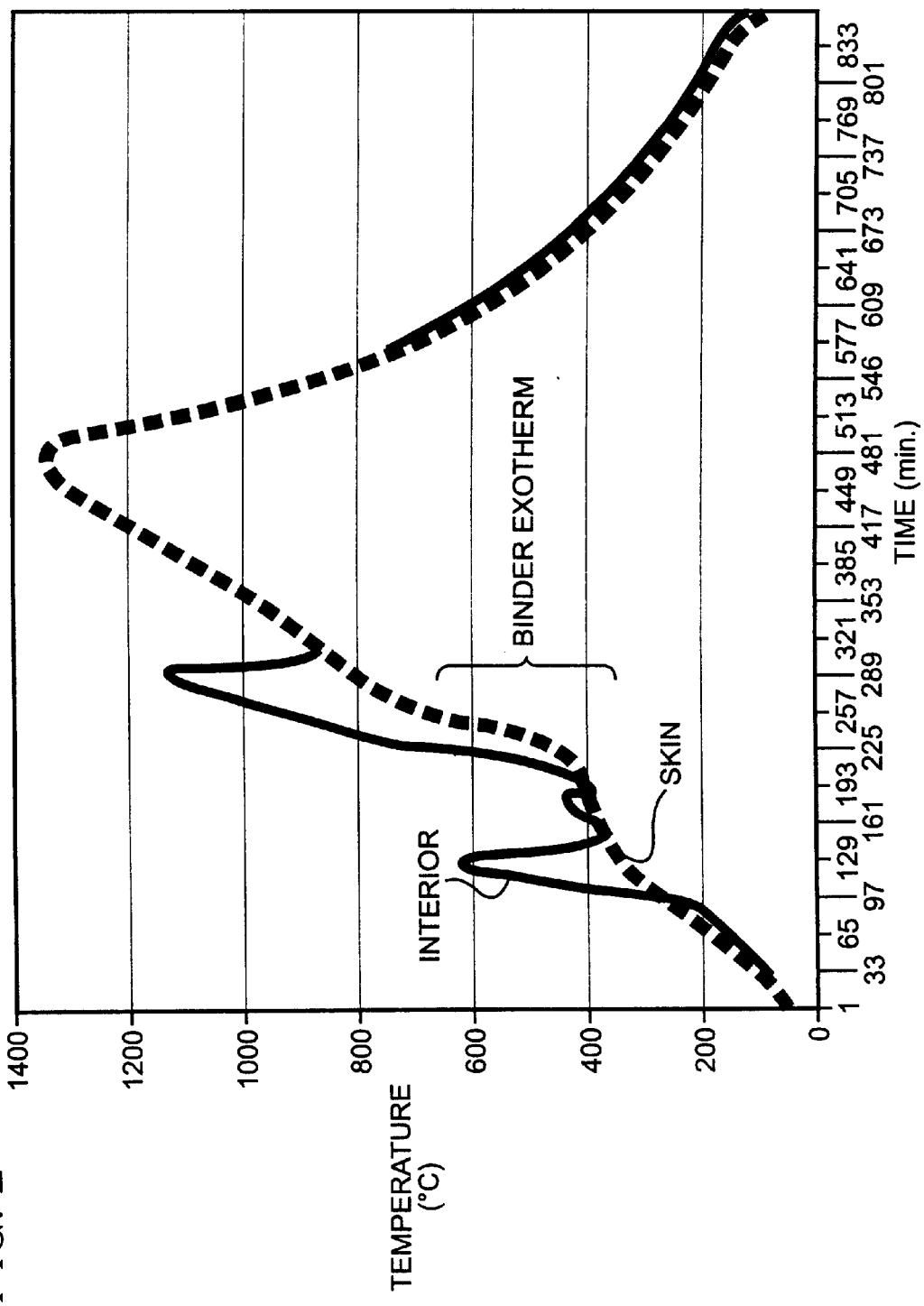
FIG. 2 shows the binder exotherm during binder burnout or removal in a comparative composition as exemplified in Example 11.

FIGS. 1 (Example 5-inventive) and 2 (Example 11-comparative) show the effect of precursors on the exotherm (and associated thermal stress) created during binder burnout. The binder removal or burnout exotherm of the inventive Example 5 in FIG. 1 is much lower than the binder removal or burnout exotherm of the comparative Example 11 in FIG. 2. It was observed that Example 5 did not crack during or after binder removal, while Example 11 did.

From the foregoing examples, it is apparent that phosphate-based ceramic bodies can be fabricated in large sizes (>4" diameter) with porosities greater than about 35%, median pore sizes greater than 8 micrometers, and permeabilities greater than 0.3×10$^{-12}$ m$^2$, without cracking during firing. Such structures are prepared by a method which utilizes coarse starting materials plus the addition of a precursor additive, with or without the addition of a pore former or a sintering aid.

It should be understood that while the present invention has been described in detail with respect to certain illustrative and specific embodiments thereof, it should not be considered limited to such but may be used in other ways without departing from the spirit of the invention and the scope of the appended claims.

TABLE 1

| Example | 1 comp. | 2 inv. | 3 inv. | 4 inv. | 5 inv. |
|---|---|---|---|---|---|
| Batch Materials | wt. % | wt. % | wt. % | wt. % | wt. % |
| BaCO$_3$ (barium source) | 21.27 | 21.27 | 21.27 | 20.51 | 20.03 |
| ZrP$_2$O$_7$ (phosphorous source) | 62.87 | 62.87 | 62.87 | 60.62 | 59.21 |
| Zirconia (zirconia source) | 13.28 | 13.28 | 13.28 | 12.8 | 12.51 |
| Quartz (silica source) | 2.59 | 2.59 | 2.59 | 0 | 0 |
| Mg(OH)$_2$ (sintering aid) | 0.8 | 0.8 | 0.8 | 0.8 | 0.75 |
| Graphite (pore former) | 20 | 20 | 20 | 20 | 20 |
| Methyl cellulose (binder) | 15 | 7.5 | 7.5 | 7.5 | 7.5 |
| Silicon Resin/DBE solution (precursor additive) | 0 | 15 | 9.1 | 9.1 | 8.26 |
| Sodium stearate (lubricant) | 0.8 | 0.8 | 0.8 | 0.8 | 0.8 |
| Water (solvent) | 30 | 15 | 15 | 19 | 20 |
| Properties | | | | | |
| Porosity (%) | 40 | 44 | 45 | 36 | 35 |
| Median Pore Size (micrometers) | 15 | 11 | 11 | 10–11 | 13–15 |
| Permeability (×10$^{-12}$ m$^2$) | 0.31 | 0.58 | | 0.34 | 0.42 |
| Mean CTE from 22–1000° C. (10$^{-7}$/° C.) | 2.7 | 2.2 | 3.4 | 1.6 | 2.3 |

TABLE 1-continued

| Example | 1 comp. | 2 inv. | 3 inv. | 4 inv. | 5 inv. |
|---|---|---|---|---|---|
| Unfired strength measured at 400° C. (lb/in$^2$) | | | | | |
| Sintered Strength (lb/in$^2$) | | | | | 548 |

TABLE 2

| Example | 6 inv. | 7 inv. | 8 inv. | 9 inv. | 10 comp. | 11 comp. |
|---|---|---|---|---|---|---|
| Batch Materials | wt. % | wt. % | wt. % | wt. % | wt. % | wt. % |
| BaCO$_3$ (barium source) | 20.03 | 20.03 | 20.03 | 20.03 | 21.27 | 21.19 |
| ZrP$_2$O$_7$ (phosphorous source) | 59.21 | 59.21 | 59.21 | 59.21 | 62.86 | 62.63 |
| Zirconia (zirconia source) | 12.51 | 12.51 | 12.51 | 12.51 | 13.28 | 13.24 |
| Quartz (silica source) | 0 | 0 | 0 | 0 | 2.59 | 2.94 |
| Mg(OH)$_2$ (sintering aid) | 0.5 | 0.55 | 0.2 | 0.7 | 0.7 | 0.6 |
| Graphite (pore former) | 20 | 20 | 20 | 0 | 0 | 10 |
| Methyl cellulose (binder) | 7.5 | 7.5 | 7.5 | 7.5 | 7.5 | 7.5 |
| Silicon Resin/DBE solution (precursor additive) | 8.26 | 8.26 | 8.26 | 8.26 | 0 | 0 |
| Sodium Stearate (lubricant) | 0.8 | 0.8 | 0.8 | 0.8 | 0.8 | 0.8 |
| Water (solvent) | 20 | 20 | 20 | 21 | 25 | 27 |
| Properties | | | | | | |
| Porosity (%) | 39 | 38 | 52 | 46 | | 37 |
| Median Pore Size (micrometers) | 12–13 | 11–12 | 9 | 12 | | 11 |
| Permeability (×10$^{-12}$ m$^2$) | 0.40 | | 0.48 | 0.98 | | |
| Mean CTE from 22–1000° C. (10$^{-7}$/° C.) | 2.9 | | | 5.1 | | |
| Unfired strength measured at 400° C. (lb/in$^2$) | | | | 39 | | 3 |
| Sintered Strength (lb/in$^2$) | | | | 433 | | |

What is claimed is:

1. A method of making a ceramic body, the method comprising:
   a) forming a mixture comprising:
      NZP-forming raw material powders selected from the group consisting of metal oxide sources capable of reacting to form a reaction product comprising an NZP phase having the general formula R$_{1+(y/2)}$Zr$_4$P$_{6-y}$Si$_y$O$_{24}$ where $0 \leq y \leq 1.0$ and R is one or more of the metals Ca, Sr, and Ba, pre-reacted powder having said general formula, and mixtures thereof; and,
      a precursor additive selected from the group consisting of silica precursor, zirconia precursor, and mixtures thereof;
   wherein the precursor additive results in improved strength during binder removal in the subsequent firing;
   b) shaping the mixture into a green structure; and,
   c) firing the green structure to produce a ceramic body, wherein the ceramic body has an open porosity of at least 35% by volume, a median pore size of at least 8 micrometers and a permeability of at least 0.30×10$^{-12}$ m$^2$.

2. The method of claim 1 wherein the precursor additive is at least 1% based on the weight of the mixture.

3. The method of claim 2 wherein the precursor additive is between 4% and 8% based on the weight of the mixture.

4. The method of claim 1 wherein the mixture further includes a sintering additive.

5. The method of claim 4 wherein the sintering additive is selected from the group consisting of magnesium, zinc, calcium, aluminum, lanthanum, titanium, bismuth, tungsten, and mixtures thereof.

6. The method of claim 5 wherein the sintering additive is between about 0.05 wt. % to 10 wt. % based on the weight of the raw material mixture.

7. The method of claim 6 wherein the sintering additive is between about 0.1% to 1% based on the weight of the raw material powders.

8. The method of claim 1 wherein the mixture further includes a pore former.

9. The method of claim 8 wherein the pore former is graphite.

10. The method of claim 8 wherein the pore former is at least 10% based on the weight of the raw material powders.

11. The method of claim 9 wherein graphite has a median particle size of at least 10 micrometers.

12. The method of claim 11 wherein graphite has a median particle size of at least 25 micrometers.

13. The method of claim 1 wherein the NZP-forming raw material powders comprise oxide compounds selected from the group consisting of zirconium, phosphorous and mixtures thereof.

14. The method of claim 13 wherein phosphorous compounds are included in the mixture and have a median particle size of at least 15 micrometers.

15. The method of claim 14 wherein the phosphorous compounds have a median particle size of at least 35 micrometers.

16. The method of claim 15 wherein the phosphorous compounds have a median particle size of at least 50 micrometers.

17. The method of claim 13 wherein the compounds are selected from the group consisting of Zr$_2$P$_2$O$_9$, ZrP$_2$O$_7$, Zr(HPO$_4$)$_{2-y}$·xH$_2$O, and mixtures of these, wherein $0 \leq y \leq 1$ and $0 \leq x \leq 2$.

18. The method of claim 1 wherein the NZP-forming raw material powders are compounds selected from the group consisting of calcium carbonate, calcium sulfate, strontium carbonate, strontium sulfate, barium carbonate, barium sulfate, and mixtures thereof.

19. The method of claim 18 wherein a median particle diameter of the total of the selected compounds is at least about 15 micrometers.

20. The method of claim 19 wherein the median particle diameter is at least 35 micrometers.

21. The method of claim 20 wherein the median particle diameter is at least 50 micrometers.

22. The method of claim 21 wherein a median particle diameter of the total of the selected compounds is at least about 15 micrometers.

23. The method of claim 22 wherein the median particle diameter is at least 35 micrometers.

24. The method of claim 23 wherein the median particle diameter is at least 50 micrometers.

25. The method of claim 24 wherein the median particle diameter is at least 100 micrometers.

26. The method of claim 1 wherein the shaping is accomplished with a process selected from the group consisting of extrusion, dry pressing, pressure casting, compression molding and injection molding.

27. The method of claim 26 wherein the shaping is accomplished with extrusion.

28. The method of claim 27 wherein the mixture is extruded into a honeycomb multicellular structure having a diameter greater 4 inches.

29. The method of claim 1 wherein the firing is carried out at a temperature of about 1200° C. to 1750° C.

30. A diesel particulate filter comprising the ceramic body made according to the method of claim 1, having the shape of a honeycomb, the honeycomb being end plugged.

31. The diesel particulate filter of claim 30 comprising an end-plugged honeycomb multicellular structure.

32. The diesel particulate filter of claim 31 wherein the filter has a cellular density between about 100 and 400 cells/in$^2$.

33. The diesel particulate filter of claim 32 wherein the filter has a cell wall thickness of about 0.010 to 0.030 inches.

34. The diesel particulate filter of claim 33 wherein the filter has a coefficient of thermal expansion from 22° C. to 1000° C. between −10 and +10×10$^{-7}$/° C.

35. The diesel particulate filter of claim 34 wherein the filter after firing has a four-point modulus of rupture of at least 150 pounds per square inch after firing.

36. The diesel particulate filter of claim 35 wherein the four-point modulus of rupture is at least 200 pounds per square inch.

37. The diesel particulate filter of claim 36 wherein the four-point modulus of rupture is at least 300 pounds per square inch.

38. The diesel particulate filter of claim 37 wherein the filter fired to 400° C. has a four-point modulus of rupture of at least 20 pounds per square inch.

39. The diesel particulate filter of claim 38 wherein the filter has a permeability of at least 0.30×10$^{-12}$ m$^2$.

40. The diesel particulate filter of claim 39 wherein the permeability is at least 0.50×10$^{-12}$ m$^2$.

41. The diesel particulate filter of claim 40 wherein the permeability is at least 1.0×10$^{-12}$ m$^2$.

42. The diesel particulate filter of claim 41 wherein the permeability is at least 2.0×10$^{-12}$ m$^2$.

43. The diesel particulate filter of claim 39 wherein the filter has an open porosity of at least 35% by volume.

44. The diesel particulate filter of claim 43 wherein the filter has a median pore size of at least 8 micrometers.

* * * * *

UNITED STATES PATENT AND TRADEMARK OFFICE
CERTIFICATE OF CORRECTION

PATENT NO. : 6,468,325 B1
DATED : October 22, 2002
INVENTOR(S) : Cutler et al.

It is certified that error appears in the above-identified patent and that said Letters Patent is hereby corrected as shown below:

Column 9,
Line 58, "of silica precursor, zirconia precursor," should be -- of silicone resin, silicone oils, Zr metal salts, zirconia colloids- --.
Line 61, "in the subsequent firing" should be -- in a subsequent firing, and inhibits large exotherms during binder removal resulting in reduced cracking --

Column 10,
Line 55, "The method of claim 21" should be -- The method of claim 1 --.

Signed and Sealed this

Eighth Day of April, 2003

JAMES E. ROGAN
*Director of the United States Patent and Trademark Office*